UNITED STATES PATENT OFFICE.

GEORGE G. SCHROEDER, OF WASHINGTON, DISTRICT OF COLUMBIA.

ARTIFICIAL STONE.

SPECIFICATION forming part of Letters Patent No. 562,201, dated June 16, 1896.

Application filed September 11, 1895. Serial No. 562,210. (No specimens.)

*To all whom it may concern:*

Be it known that I, GEORGE G. SCHROEDER, a citizen of the United States, residing at Washington, in the District of Columbia, have invented certain new and useful Improvements in Artificial Stone; and I do declare the following to be a full, clear, and exact description of the invention, such as will enable others skilled in the art to which it appertains to make and use the same.

My invention consists in an improved method of producing artificial stone, which can either be formed in bricks and used as are the ordinary bricks, or the same can be laid as is done with asphaltum, the object being to make an artificial stone that will not only be impervious to water, but at the same time retain its solid state in all seasons of the year, as well as withstanding the wear and tear that the same would be subjected to in large cities where the traffic over the same would be great, as well as being heavy. In preparing my compositions for the manufacture of artificial stone (to make, say, one hundred pounds) I take five pounds of rosin, melt the same in the proper receptacle, and then mix with the same thirty pounds of pebbles or broken stone, as the case may be, although the former is the preferable of the two, as they do not absorb the rosin but become well coated with the same. The rosin and pebbles are kept agitated together until the latter have been heated well through. Then I add forty pounds of silica or sand and keep the same working until it is thoroughly mixed, and heated to the same temperature as the rest, then I add twenty-five pounds of Round Top cement or any other brand that may be available, then add one pound of ground sulfate of copper, the latter having setting or hardening qualities that make the whole composition when spread out flat or formed into blocks or bricks very strong.

It should be noted that the various ingredients employed in producing the resulting product are all thoroughly mixed together while in a heated state, so that the pebbles or broken stone will be kept thoroughly hot while being completely coated with the rosin, and before the other ingredients are added, and the stone or pebbles will be still maintained hot while being thoroughly covered and mixed with the cement, sand, or other ingredients. Material advantages in the resulting compound are thus attained, as the ingredients are thus so compounded together that a homogeneous mass is attained after the compound has set and hardened, and the hard pebbles and stones cannot be loosened or picked out, but seem to become a permanent and intimate part of the hard body or resulting stone.

The composition being mixed in about the proportions above stated, it will be seen that each and every ingredient is thoroughly mixed with each other, and that the same when laid for a walk will give an even unbroken surface. It is also applicable for gutters, curbing, pipes, &c., where it is desired to substitute it for the regular stone, the finish being more complete than is usual with the natural material, while the advantages of laying the material in a plastic mass are obvious.

In surfacing the street the material is laid while in its heated state, and after having been leveled off is left to cool, the sulfate of copper causing the composition to set very soon. With a surface as above described, it will be seen that there is little or no danger of a horse or even a pedestrian slipping, and the pebbles or broken stone will never become dislodged from their place by reason of the wear on their surface.

By employing my improved composition and method the cellars of buildings can also be kept absolutely dry, and the making of pipes, troughs, &c., is rendered economical, as the material is cheap and can be handled with much better results than the natural stone itself.

In making bricks of my composition, the material after being thoroughly heated, as above described, is put in molds of any desired shape or size, and then pressed in any desirable way. When the compound has cooled sufficiently, the mold-box is removed, and the brick permitted to stand for a short while before being used, the product thus produced being completely waterproof, and when laid will be impervious to water as well as to the corrosive chemical products. Here it may be stated that any suitable coloring material may be used, should the same be desired to give the desired effect, for the particular object for which it is going to be used.

From the foregoing it will be seen that I can use the composition for any number of purposes, for instance, making pipes, conduits for wires, troughs, &c., where the same is required to be absolutely waterproof. With this composition in laying conduits for electric wires the same can be laid more easily and cheaper than is done now. For instance, when it is desired to connect one or more sections together, the ends to be joined are heated and pressed together, or are sealed with a hot iron and then put together. In this way my joint then becomes the same as the body of the sections, the conduit thereby being impervious to water.

It is obvious that I do not wish to limit myself to the particular proportions described or named herein.

Having described my invention, what I claim is—

The herein-described method of making artificial stone which consists in first heating and melting a suitable quantity of rosin, then mixing a suitable proportion of heated pebbles or broken stone with the melted rosin in the presence of heat, and thoroughly agitating the hot mass until the individual pebbles and stones are each thoroughly coated and covered with a film of melted rosin, then adding a suitable proportion of sand or silica to the hot mass, and mixing the same therein, and finally adding suitable proportions of cement and sulfate of copper and thoroughly mixing and agitating the heated mass until all the parts thereof are heated, substantially as set forth.

In testimony whereof I affix my signature in presence of two witnesses.

GEORGE G. SCHROEDER.

Witnesses:
J. B. McGIRR,
HARRY D. GORDON.